United States Patent [19]

Lenz

[11] Patent Number: 4,629,087
[45] Date of Patent: Dec. 16, 1986

[54] WATER CONTAINER

[75] Inventor: Dick Lenz, Hutchinson, Minn.

[73] Assignee: AG Systems, Inc., Hutchinson, Minn.

[21] Appl. No.: 667,649

[22] Filed: Nov. 2, 1984

[51] Int. Cl.⁴ .............................................. B65D 6/00
[52] U.S. Cl. .................................. 220/85 S; 220/5 A; 220/23.83
[58] Field of Search .................. 220/85 S, 1 B, 5 A, 220/23.83, 23.86; 224/148; 239/147, 172, 303, 304, 307, 308, 77

[56] References Cited

U.S. PATENT DOCUMENTS

| | | |
|---|---|---|
| 344,538 | 6/1886 | McFarland . |
| 1,219,502 | 3/1917 | Straus . |
| 2,504,738 | 4/1950 | Shields .................................. 224/43 |
| 2,530,819 | 11/1950 | Hamlin .............................. 220/5 A X |
| 2,630,247 | 3/1953 | Rafferty .............................. 222/159 |
| 2,770,399 | 11/1956 | Gross .................................. 222/211 |
| 3,198,397 | 8/1965 | LoBello .......................... 224/148 X |
| 3,495,751 | 2/1970 | Moran .................................. 224/43 |
| 4,280,643 | 7/1981 | Cordova et al. .................... 294/141 |
| 4,416,396 | 11/1983 | Ward ................................. 222/129 |

Primary Examiner—Steven M. Pollard
Attorney, Agent, or Firm—Merchant, Gould, Smith, Edell, Welter & Schmidt

[57] ABSTRACT

An auxiliary water container mounted on an agricultural chemical tank by a pair of straps which encircle the chemical tank and overlies shoulders formed on the auxiliary housing. Ridges formed on the shoulders outwardly of each of the straps restrain the straps from accidental displacement from the shoulders and the auxiliary water container from its position on the chemical tank. The auxiliary water container is further provided with liquid dispensing apparatus which is easily accessible along both sides of the chemical tank if chemicals are accidentally spilled on an individual in the vicinity of the chemical tank.

6 Claims, 5 Drawing Figures

4,629,087

WATER CONTAINER

TECHNICAL FIELD

The present invention is directed to a water container mounted on an agricultural chemical tank so as to provide easy access thereto should it become necessary to flush chemicals which may be accidentally spilled on an individual in the vicinity of the tank.

BACKGROUND OF THE INVENTION

Auxiliary water containers mounted on an agricultural chemical tank, such as an anhydrous ammonia farm fertilizer tank, for flushing accidental spills of chemicals from the tank on an individual are known in the art. However, such containers have presented problems not heretofore solved.

Because such farm fertilizer tanks must travel over extremely rough terrain during use, they may become accidentally displaced from their desired position on the fertilizer tank and often rendered totally inoperative. In addition, liquid outlet mechanism must be provided which is foolproof in operation and easily accessible in the vicinity of the tank to flush chemicals which may be accidentally spilled in the eyes or on the body of an individual.

Prior art devices have been so constructed as to be difficult to disengage fluid dispensing conduits or hoses from their storage state for the above flushing operation and on occasion have become inoperative during hasty emergency use thereof due to breakage or the like of the apparatus mounting the fluid dispensing conduits.

SUMMARY OF THE INVENTION

The present invention is directed in a general sense to an auxiliary liquid container which may be securely mounted on a primary liquid container such as an anhydrous ammonia farm fertilizer tank and which is provided with liquid dispensing means that is dependable in use and easily accessible along both sides of the fertilizer tank if chemicals in the fertilizer tank are accidentally spilled on an individual using the fertilizer tank.

Particularly, the present invention is directed to an auxiliary liquid container provided with shoulders on opposite end walls thereof. The auxiliary container is securely mounted on a primary tank by a strap which engages each shoulder and encircles the primary container. Bridges on the shoulders outwardly of the straps maintain the straps in engagement with respective shoulders and prevent accidental displacement of the auxiliary container from its desired position on the primary tank during periods when the primary tank is traversing rough terrain.

More particularly, the auxiliary container is provided with a liquid outlet nipple projecting laterally from each side wall adjacent the juncture of one end wall with each side wall and the bottom wall of the auxiliary liquid container. A venting nipple is mounted in the top wall adjacent the juncture of the top wall with the opposite end wall and each side wall of the auxiliary liquid container. Each venting nipple includes a portion which extends laterally in a direction generally parallel to the corresponding outlet nipple. An elongated liquid conduit or hose is fixedly attached to each liquid outlet and removably attached to a venting nipple on a corresponding side of the auxiliary liquid container. Each hose is elongated enough to form an enlarged loop disposed along an adjacent side of the tank for easy access to flush chemicals accidentally spilled in the eyes or on the body of an individual using the tank.

In addition to the above advantages, other advantages and objects obtained by the invention are more fully explained hereinafter by reference to drawings of the preferred embodiment and descriptive matter related thereto. In considering the disclosure, it should be kept in mind that the embodiment disclosed is representative of an advantageous concept and that only the claims limit the extent of the invention.

DETAILED DESCRIPTION OF THE PREFERRED EMBODIMENT

Figure 1:
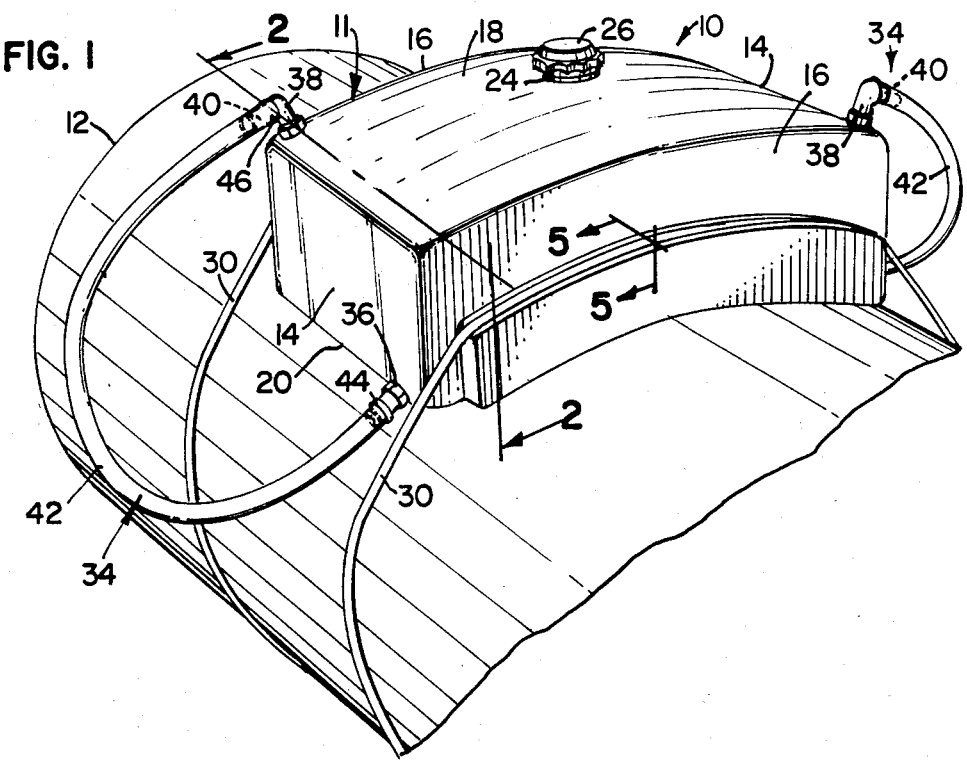
FIG. 1 is a fragmentary perspective view of a conventional agriculatural chemical tank having an auxiliary liquid container constructed in accordance with the present invention mounted thereon.
Figure 2:
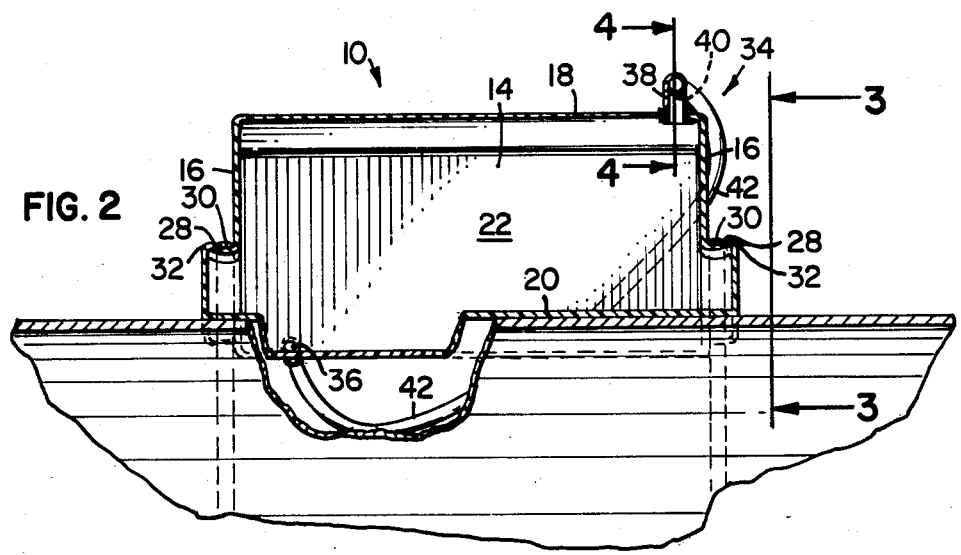
FIG. 2 is a sectional view as seen generally from the line 2—2 of FIG. 1.

Referring now to the drawings wherein like reference numerals designate identical or corresponding parts throughout the several views, and more particularly to FIG. 1, an auxiliary liquid container is designated generally by the numeral 10. Container 10 is shown as being mounted on a primary liquid container such as that which might be used on an anhydrous ammonia farm fertilizer tank indicated generally by the numeral 12. It will be appreciated that such tanks 12 are normally equipped with spray booms, not shown, and are mounted on vehicles or provided with wheels, also not shown, for transport over farm fields. It will be appreciated by those skilled in the art that the above described farm fertilizer tank 12 is identified for purposes of description only and auxiliary liquid containers 10, as hereinafter described, may be utilized with other primary liquid containers containing various chemicals. It is understood, that auxiliary containers 10 constructed in accordance with the present invention will be limited only by the scope of the appended claims.

As shown, the auxiliary container 10 includes a housing 11 having opposed side walls 14, opposed end walls 16 and top and bottom walls 18-20, respectively, all of which cooperate to define an enclosed chamber 22. The bottom wall 20 is shaped to conform generally to the adjacent surface of the primary container for a reason which will become apparent hereinafter. In addition, the top wall 18 is formed to a shape conforming generally to the bottom wall 20 for aesthetic appearances and to present a low profile.

Inlet means 24 including a removable closure member 26 is formed in the top wall 18 for providing access to the enclosed chamber 22.

Shoulder means in the form of a ledge 28 is formed on each of the opposed end walls 16 for the purpose of attaching the auxiliary container 10 to the tank 12. As shown, the ledges 28 each extend for a substantial distance between the side walls 14 and are shaped to conform generally to the shape of the bottom wall 20. Securing means such as a strap 30 overlies each of the ledges 28 and thereafter encircles the tank 12 to securely affix the auxiliary tank 10 in a desired position on the tank 12. Because such agricultural chemical tanks 12 must often travel over relatively rough terrain, the straps 30, could easily become disengaged from their respective ledges 28, resulting in accidental displacement of the auxiliary liquid container 10 from its desired position. To prevent this occurrence, abutment means in the nature of a ridge 32 is formed on each of the ledges 28 outwardly of the straps 30 to extend substantially the length of respective ledges 28. Because the bottom wall 20 is formed to conform to the shape of the fertilizer tank 12 and because the ledges 28 are provided with the ridges 32 to positively retain the straps 30 on the ledges 28, the auxiliary tank 10 is securely affixed on the tank 12 in its desired position in spite of forces exerted thereagainst during such travel over rough terrain.

Figure 3:
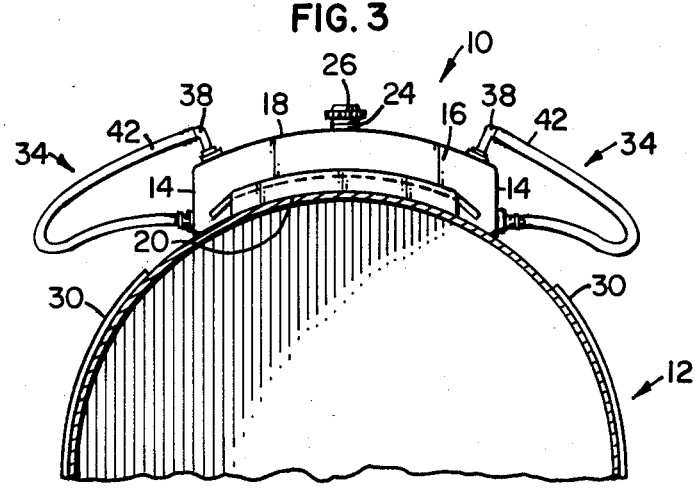
FIG. 3 is a fragmentary sectional view as seen generally from the line 3—3 of FIG. 1, portions thereof being shown in elevation.
Figure 4:
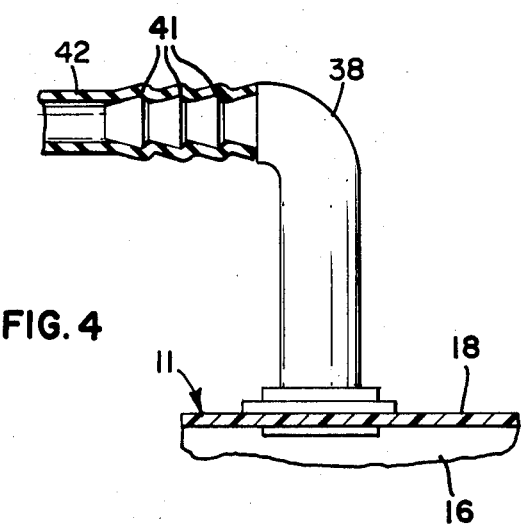
Figure 5:
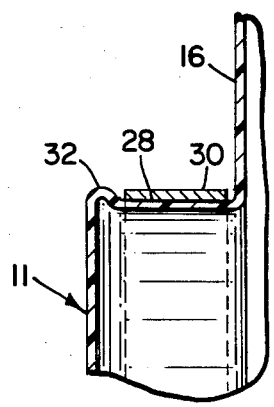

In the farming community, it is common for farmers to spill anhydrous ammonia or other chemicals contained within the tank 12 on themselves. It is critical that a liquid, such as water, be immediately available, regardless of the position of the farmer relative to the tank 12, for flushing the skin or eyes of the farmer. With this in mind, liquid outlet means, indicated generally by the numeral 34, is provided for dispensing water from the enclosed chamber to positions along either side of the primary tank 12. As can be seen from FIGS. 1 and 3, side walls 14 are elongated in a direction extending between the end walls 16. Because the liquid outlet means 34 are mirror images, only one thereof will be described in detail and like parts of each thereof will carry similar numerals.

As shown, the liquid outlet means 34 comprises an outlet nipple 36 mounted in a side wall 14 adjacent one of the end walls 16 and the bottom wall 20 to extend laterally outwardly therefrom. A venting nipple 38 is mounted in the top wall 18 adjacent the opposite end wall 16 and the side wall 14 and includes a portion 40 which extends in a direction generally corresponding to the outlet nipple 36 for a reason which will become apparent hereinafter. An elongated flexible conduit or hose 42 extends between the outlet nipple 36 and the portion 40 of the venting nipple 38 and is transparent to indicate the liquid level in the enclosed chamber 22. Because of the above described position of the outlet nipple 36 and venting nipple 38 it can be seen that a rather large loop is formed by the liquid dispensing hose 42. Thus, in cases where accidental spillage of the contents of the tank 12 affects the eyes or other parts of an individual's body, he may quickly move along either side of the tank 12 and engage the enlarged loop of the hose 42 with an extended arm. As seen in FIG. 1, the flexible hose 42 is fixedly secured to the outlet nipple 36 by means of a clamp or band 44 and is removably secured to the portion 40 of venting nipple 38 by telescopic reception of the end 46 of hose 42 over the portion 40 of nipple 38. Because the portion 40 extends in a direction generally corresponding to the outlet nipple 36, the hose 42 may be removed with a minimum of strain on the venting nipple 38 and with a minimum of ease by an individual whether he can see the hose 42 or not. The portion 40 is further provided with the annular ridges 41 that are spaced along the portion 40. The ridges 41 discourage accidental removal of the end 46 of hose 42 from the vent 38 but permits such removal when the hose 42 is pulled by the individual. Also, because the nipples 36, 38 are positioned as above described, the loop formed by the hose 42 is rather large and does not crimp along its length during periods of nonuse. Thus, a maximum flow of water from the container 10 during emergency use is provided.

The simplicity of design, minimal manufacturing requirements and ease with which the invention is used all combine to provider an auxiliary liquid container which truly advances the state of the art. The invention fulfills the purpose of providing for easy emergency access to a flushing fluid and the case of accidental spills of chemicals from within a primary tank as well as providing an auxiliary tank which may be securely mounted on a primary tank against accidental displacement thereof from a desired position thereon. Of course, modifications of the various parts of the invention is in keeping with the teachings set forth above would be possible to those skilled in the art. Thus, the invention is believed limited only by the scope of the claims which follows.

What is claimed is:

1. An auxiliary safety container for liquid for use with a chemical-containing primary container, said safety container having liquid readily available for flushing from a person any spilled chemical from said primary container, said auxiliary safety container comprising:
   a. a housing having opposed side walls, opposed end walls and top and bottom walls defining an enclosed chamber, said bottom wall conforming generally to the adjacent surface of the primary container;
   b. inlet means including a removable closure member formed in said top wall for providing access to said enclosed chamber;
   c. means for attaching said housing to the primary container, said attaching means including a shoulder attached to said housing, said attaching means further including means for engaging said shoulder to secure said auxiliary container to the primary container, said attaching means still further including abutment means attached to said shoulder for discouraging accidental displacement of said securing means from said shoulder; and
   d. liquid outlet means on each of said side walls for dispensing a liquid from said enclosed chamber to a position along the side of the primary container, said liquid outlet means including an outlet nipple mounted in said side wall adjacent one of said end walls and said bottom wall to extend laterally outwardly therefrom, a venting nipple mounted in said top wall adjacent the other of said end walls and said side wall and including an end portion extending in a direction generally the same as said outlet nipple and a flexible conduit extending between said outlet nipple and said venting nipple;
   whereby said conduit may be readily pulled from said venting nipple to drain liquid from said outlet nipple through said conduit to flush said person.

2. The auxiliary container of claim 1 wherein said shoulder includes a ledge formed on each of said opposed end walls generally adjacent said bottom wall and in which each of said ledges extend for a substantial length between said side walls and conforms generally to the shape of said bottom wall, said securing means including a strap overlying each of said ledges and encircling the primary container, said abutment means including a ridge formed on each of said ledges outwardly of said straps.

3. The auxiliary container of claim 1 wherein each of said side walls includes liquid outlet means for dispensing liquid from said enclosure to a position along an adjacent side of the primary container.

4. The auxiliary container of claim 1 wherein said liquid outlet means includes first means for fixedly securing said flexible conduit to said liquid outlet nipple and second means for removably securing said flexible conduit to said venting nipple thereby providing easy access to liquid contained within said auxiliary container.

5. The auxiliary container of claim 4 wherein said second means includes a plurality of annular ridges on and spaced along said portion extending in a direction corresponding to said outlet nipple to restrain accidental removal of said flexible conduit.

6. An auxiliary liquid container for use with a primary liquid container comprising:
  a. a housing having opposed side walls, opposed end walls and top and bottom walls defining an enclosure, said bottom wall conforming generally to the adjacent surface of the primary container;
  b. inlet means, including a removable closure member, formed in said top wall for introducing liquid into said liquid enclosure;
  c. a ledge formed on each of said opposed end walls generally adjacent said bottom wall, each of said ledges extending for a substantial distance between said side walls and conforming generally to the shape of said bottom wall;
  d. a strap overlying each of said ledges and encircling the primary container;
  e. a ridge formed on each of said ledges outwardly of said straps;
  f. an outlet nipple mounted in each of said side walls adjacent one of said end walls and said bottom wall to extend to laterally outwardly therefrom;
  g. a venting nipple mounted in said top wall adjacent the other of said end walls and each of said side walls, each venting nipple including a portion extending in a direction corresponding to an adjacent outlet nipple;
  h. a flexible conduit extending between each of said outlet nipples and an adjacent venting nipple, said flexible conduits each being transparent to indicate the liquid level of the enclosure; and
  i. each of said flexible conduits being fixedly secured to a liquid outlet nipple and removably secured to an adjacent venting nipple whereby to provide easy access to liquid contained within said auxiliary container at a position along an adjacent side of the primary container.

* * * * *